US012787060B2

(12) United States Patent
Shafin et al.

(10) Patent No.: US 12,787,060 B2
(45) Date of Patent: Nov. 3, 2026

(54) METHOD AND APPARATUS FOR TWT OPERATION FOR WLAN SYSTEMS

(71) Applicant: Samsung Electronics Co., Ltd., Suwon-si (KR)

(72) Inventors: Rubayet Shafin, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 18/458,947

(22) Filed: Aug. 30, 2023

(65) Prior Publication Data

US 2024/0098784 A1 Mar. 21, 2024

Related U.S. Application Data

(60) Provisional application No. 63/421,434, filed on Nov. 1, 2022, provisional application No. 63/407,040, filed on Sep. 15, 2022.

(51) Int. Cl.
*H04W 74/0808* (2024.01)
*H04W 74/04* (2009.01)

(52) U.S. Cl.
CPC ....... *H04W 74/0808* (2013.01); *H04W 74/04* (2013.01)

(58) Field of Classification Search
None
See application file for complete search history.

(56) References Cited

U.S. PATENT DOCUMENTS

| | | | | |
|---|---|---|---|---|
| 11,382,035 | B2 | 7/2022 | Kwon et al. | |
| 2022/0110053 | A1 | 4/2022 | Chu et al. | |
| 2023/0128915 | A1* | 4/2023 | Kim | H04W 72/12 370/329 |
| 2023/0413328 | A1* | 12/2023 | Kim | H04W 52/0216 |
| 2024/0422674 | A1* | 12/2024 | Ryu | H04W 40/244 |

FOREIGN PATENT DOCUMENTS

WO 2022182146 A1 9/2022

OTHER PUBLICATIONS

Extended European Search Report issued Jun. 2, 2025 regarding Application No. 23865781.1, 15 pages.

(Continued)

*Primary Examiner* — Walter J Divito

(57) ABSTRACT

Methods and apparatuses for facilitating broadcast target wake time (TWT) negotiation on one link between multi-link devices (MLDs) in a wireless local area network to establish broadcast TWT schedules on other links between the same MLDs. A non-access point (AP) MLD comprises a processor and stations (STAs), each comprising a transceiver configured to form a link with a corresponding AP of an AP MLD. The processor is operably coupled to the STAs and configured to generate or receive a first message for a broadcast TWT negotiation, wherein the first message indicates that the broadcast TWT negotiation is for a broadcast TWT schedule on at least one first link of the links. The transceiver of a first of the STAs is further configured to transmit or receive the first message to or from the AP MLD over a second of the links.

20 Claims, 7 Drawing Sheets

(56) References Cited

OTHER PUBLICATIONS

Shafin et al., "Resolution for CIDs in CC36", doc.: IEEE 802.11-22/0254r1, Apr. 2022, 13 pages.
Shafin et al., "Comment Resolution on TWT", doc.: IEEE 802.1122/1051r3, Sep. 2022, 7 pages.
IEEE P802.11be—D2.1 "Part 11: Wireless LAN Medium Access Control (MAC) and Physical Layer (PHY) Specifications, Amendment 8: Enhancements for extremely high throughput (EHT)" Jul. 2022, 885 pages.
IEEE P802.11be—D3.0 "Part 11: Wireless LAN Medium Access Control (MAC) and Physical Layer (PHY) Specifications—Amendment 8: Enhancements for extremely high throughput (EHT)" Jan. 2023, 999 pages.
International Search Report and Written Opinion issued Dec. 1, 2023 regarding International Application No. PCT/KR2023/013293, 9 pages.
Lopez-Raventos et al., "Multi-link Operation in IEEE 802.11be WLANs", IEEE Wireless Communications, vol. 29, Issue 4, May 2022, pp. 94-100.
Nurchis et al., "Target Wake Time: Scheduled Access in IEEE 802.11ax WLANs", IEEE Wireless Communications, vol. 26, Issue 2, Mar. 2019, pp. 142-150.

* cited by examiner

METHOD AND APPARATUS FOR TWT OPERATION FOR WLAN SYSTEMS

CROSS-REFERENCE TO RELATED APPLICATION AND CLAIM OF PRIORITY

This application claims priority under 35 U.S.C. § 119(e) to U.S. Provisional Patent Application No. 63/407,040 filed on Sep. 15, 2022, and to U.S. Provisional Patent Application No. 63/421,434 filed on Nov. 1, 2022, which are hereby incorporated by reference in their entirety.

TECHNICAL FIELD

This disclosure relates generally to power management in wireless communications systems that include multi-link devices. Embodiments of this disclosure relate to methods and apparatuses for facilitating establishment of broadcast Target Wake Time schedules on links between multi-link devices in a wireless local area network communications system.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. The component of an MLD that is responsible for transmission and reception on one link is referred to as a station (STA).

Target wake time (TWT) is one of the most important features for power management in WI-FI networks, which was developed by IEEE 802.11ah and later adopted and modified into IEEE 802.11ax. With TWT operation, it suffices for a STA to only wake up at a pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

Restricted TWT (rTWT, r-TWT, or R-TWT) operation is a newly introduced feature in IEEE 802.11be, which provides more protection for restricted TWT scheduled STAs in order to serve latency-sensitive applications in a timely manner. Restricted TWT is based on Broadcast TWT mechanisms, however, there are some key characteristics that make restricted TWT operation an important feature for supporting low-latency applications in next generation W LAN systems. Restricted TWT offers a protected service period for its member STAs by sending Quiet elements to other STAs in the basic service set (BSS) which are not members of the rTWT schedule, where the Quiet interval corresponding to the Quiet element overlaps with the initial portion of the restricted TWT service period (SP). Hence, it gives more channel access opportunities to the rTWT member scheduled STAs, which helps latency-sensitive traffic flows.

SUMMARY

Embodiments of the present disclosure provide methods and apparatuses for facilitating broadcast TWT negotiation on one link between MLDs in a WLAN to establish broadcast TWT schedules on other links between the same MLDs.

In one embodiment, a non-AP MLD is provided, comprising STAs and a processor operably coupled to the STAs. The STAs each comprise a transceiver configured to form a link with a corresponding AP of an AP MLD. The processor is configured to generate or receive a first message for a broadcast TWT negotiation, wherein the first message indicates that the broadcast TWT negotiation is for a broadcast TWT schedule on at least one first link of the links. The transceiver of a first of the STAs is further configured to transmit or receive the first message to or from the AP MLD over a second of the links.

In another embodiment, a method of wireless communication performed by a non-AP MLD that comprises STAs is provided. The STAs each comprise a transceiver configured to form a link with a corresponding AP of an AP MLD. The method comprises the steps of generating or interpreting a first message for a broadcast target wake time (TWT) negotiation, wherein the first message indicates that the broadcast TWT negotiation is for a broadcast TWT schedule on at least one first link of the links, and transmitting or receiving the first message to or from the AP MLD over a second of the links.

In another embodiment, an AP MLD is provided, comprising APs and a processor operably coupled to the APs. The APs each comprise a transceiver configured to form a link with a corresponding STA of a non-AP MLD. The processor is configured to generate or receive a first message for a broadcast TWT negotiation, wherein the first message indicates that the broadcast TWT negotiation is for a broadcast TWT schedule on at least one first link of the links. The transceiver of a first of the APs is further configured to transmit or receive the first message to or from the non-AP MLD over a second of the links.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C. As used herein, such terms as “1st” and “2nd,” or “first” and “second” may be used to simply distinguish a corresponding component from another and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that the current 802.11 specification is not clear with respect to how a broadcast TWT schedule may be established on a link between an AP MLD and a non-AP MLD. According to the current specification, in order to establish a broadcast TWT schedule on a first link between an AP MLD and an associated non-AP MLD, the corresponding TWT negotiation would need to take place on the first link—i.e., the exchange of the TWT Setup frames corresponding to the broadcast TWT negotiation for a first link between the AP MLD and the non-AP MLD would need to happen on the first link.

Currently, it is not possible to perform the broadcast TWT negotiation on a second link between the AP MLD and the non-AP MLD in order to establish a TWT schedule on the first link between the same AP MLD and non-AP MLD. This may increase latency in establishing a TWT schedule on the first link since the STA that is affiliated with the non-AP MLD and operating on the second link may gain access to the channel faster than the STA that is affiliated with the non-AP MLD and operating on the first link.

Accordingly, embodiments of the disclosure provide mechanisms for facilitating broadcast TWT negotiation on one link between MLDs to establish broadcast TWT schedules on other links between the same MLDs.

Figure 1:
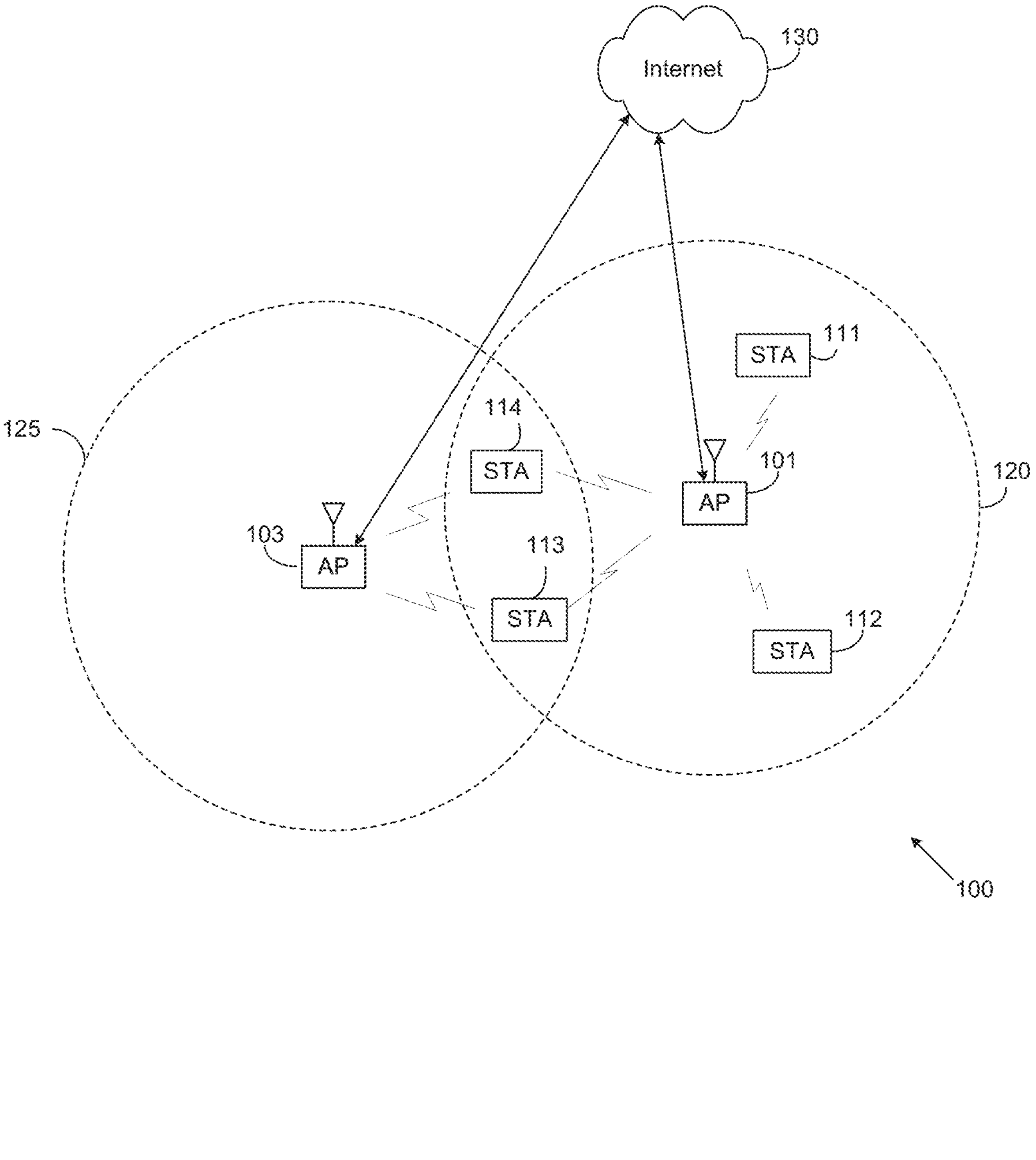
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs

101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating broadcast TWT negotiation on one link between MLDs in a WLAN to establish broadcast TWT schedules on other links between the same MLDs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
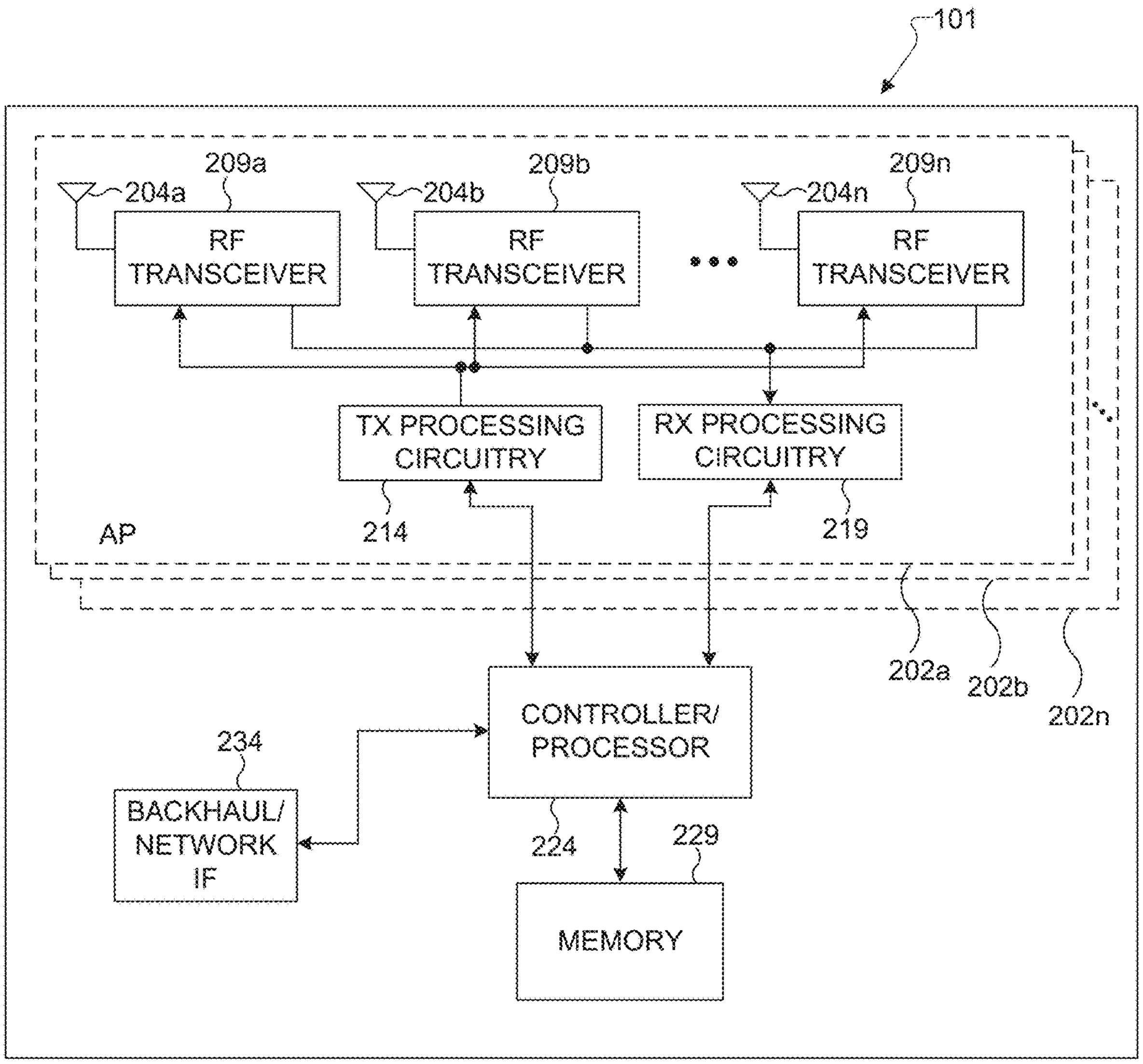
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202*a*-202*n* (which may be referred to, for example, as AP1-APn). Each of the affiliated APs 202*a*-202*n* includes multiple antennas 204*a*-204*n*, multiple RF transceivers 209*a*-209*n*, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202*a*-202*n* may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202*a*-202*n*.

For each affiliated AP 202*a*-202*n*, the RF transceivers 209*a*-209*n* receive, from the antennas 204*a*-204*n*, incoming RF signals, such as signals transmitted by STAs in the network 100. In some embodiments, each affiliated AP 202*a*-202*n* operates at a different bandwidth, e.g., 2.4 GHz, 5 GHz, or 6 GHz, and accordingly the incoming RF signals received by each affiliated AP may be at a different frequency of RF. The RF transceivers 209*a*-209*n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202*a*-202*n*, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-convert the baseband or IF signals to RF signals that are transmitted via the antennas 204*a*-204*n*. In embodiments wherein each affiliated AP 202*a*-202*n* operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating broadcast TWT negotiation on one link between MLDs in a WLAN to establish broadcast TWT schedules on other links between the same MLDs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connections. For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating broadcast TWT negotiation on one link between MLDs in a WLAN to establish broadcast TWT schedules on other links between the same MLDs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202*a*-202*n* is shown as including a single instance of TX processing circuitry 214 and a single instance of RX processing circuitry 219, the AP MLD 101 could include multiple instances of each (such as one per RF transceiver) in one or more of the affiliated APs 202*a*-202*n*. Alternatively, only one antenna and RF transceiver path may be included in one or more of the affiliated APs 202*a*-202*n*, such as in legacy APs. Also, various components in FIG. 2A could be combined, further subdivided, or omitted and additional components could be added according to particular needs.

Figure 2B:
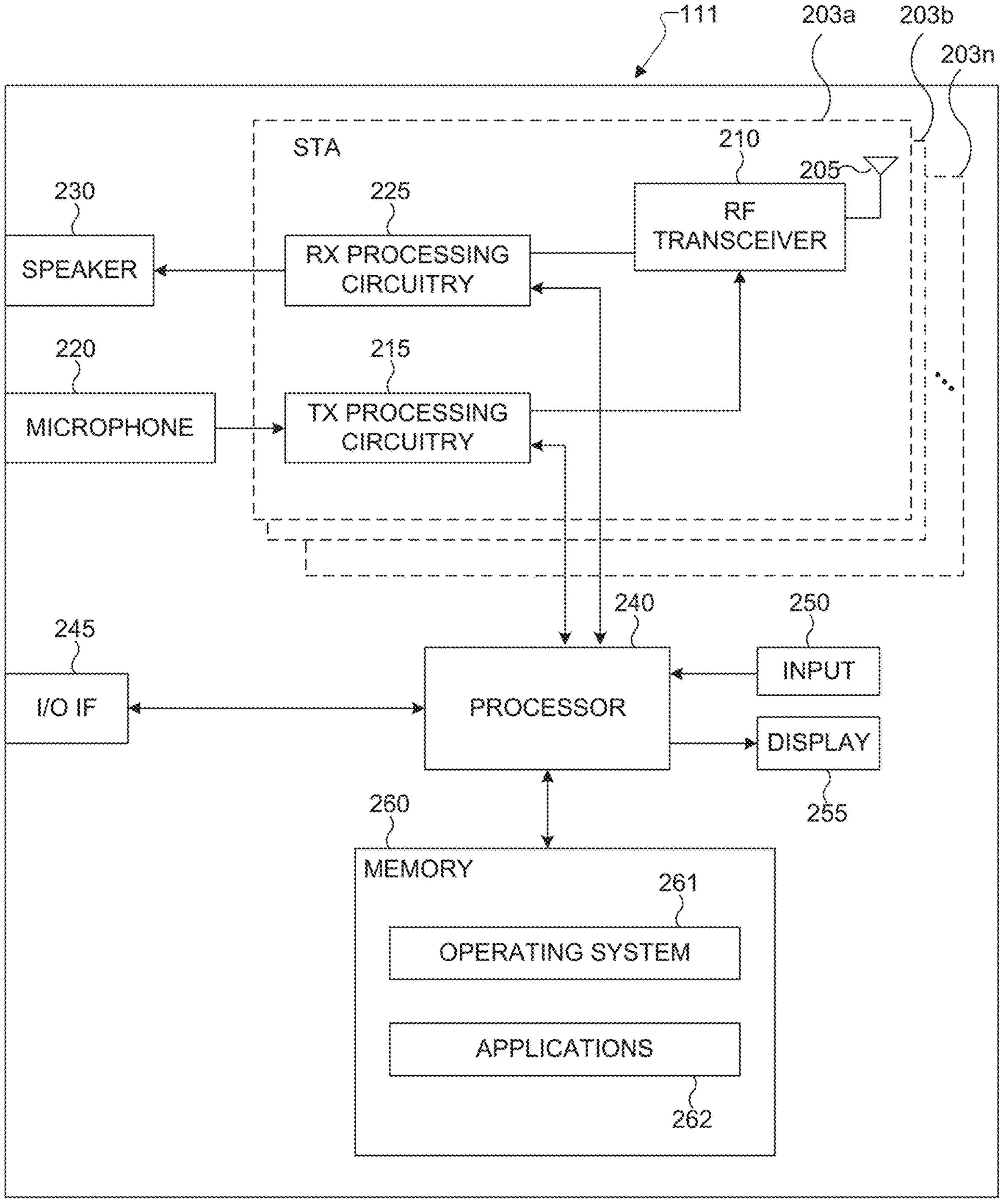
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203*a*-203*n* (which may be referred to, for example, as STA1-STAn). Each of the affiliated STAs 203*a*-203*n* includes antennas 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203*a*-203*n* may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203*a*-203*n*.

For each affiliated STA 203*a*-203*n*, the RF transceiver 210 receives from the antennas 205, an incoming RF signal transmitted by an AP of the network 100. In some embodiments, each affiliated STA 203*a*-203*n* operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203*a*-203*n*, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antennas 205. In embodiments wherein each affiliated STA 203*a*-203*n* operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate broadcast TWT negotiation on one link between MLDs in a WLAN to establish broadcast TWT schedules on other links between the same MLDs. In some embodiments, the controller/processor 240 includes at least one microprocessor or microcontroller.

The controller/processor 240 is also capable of executing other processes and programs resident in the memory 260, such as operations for facilitating broadcast TWT negotiation on one link between MLDs in a WLAN to establish broadcast TWT schedules on other links between the same MLDs. The controller/processor 240 can move data into or out of the memory 260 as required by an executing process. In some embodiments, the controller/processor 240 is configured to execute a plurality of applications 262, such as applications for facilitating broadcast TWT negotiation on one link between MLDs in a WLAN to establish broadcast TWT schedules on other links between the same MLDs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203*a*-203*n* may include any number of antennas 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
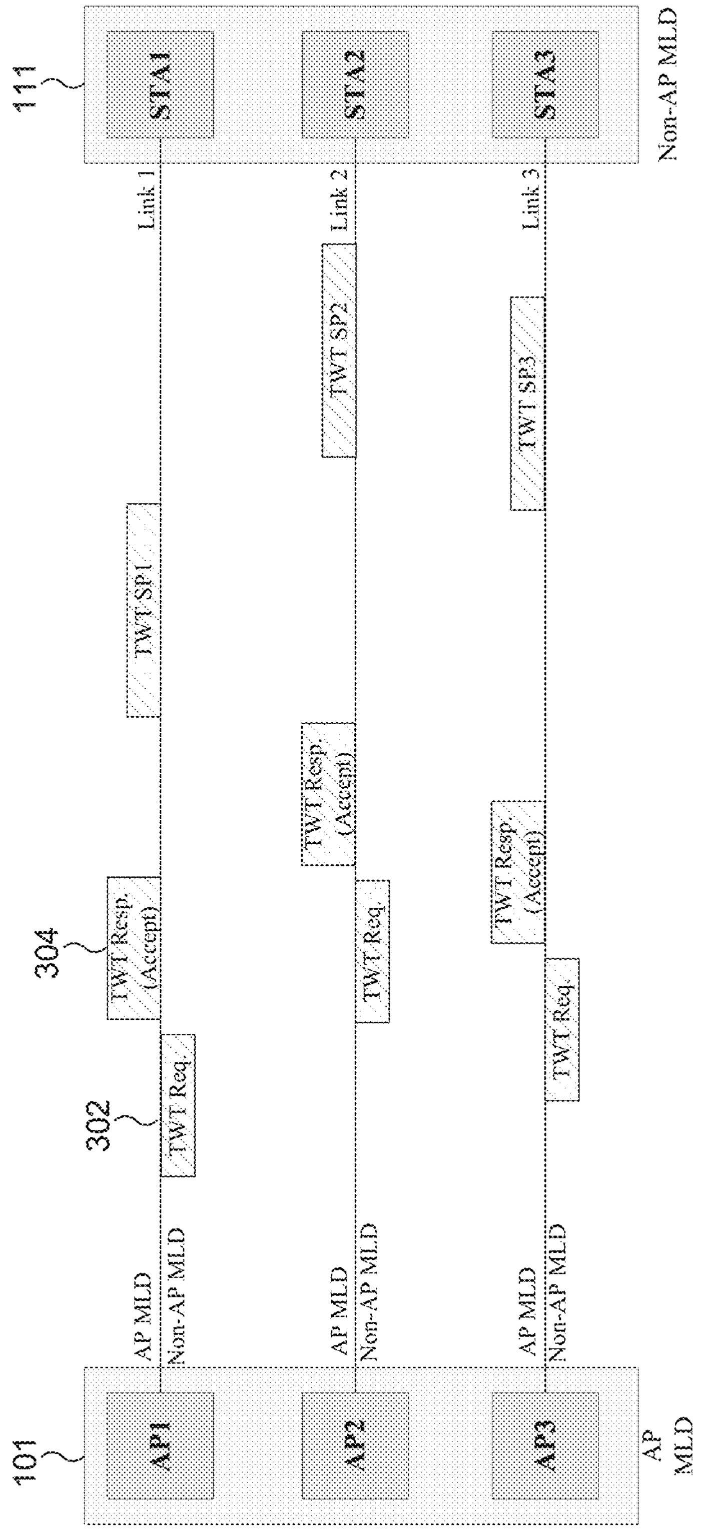
FIG. 3 illustrates an example of broadcast TWT negotiation according to embodiments of the present disclosure.

FIG. 3 illustrates an example of broadcast TWT negotiation according to embodiments of the present disclosure. In this example the AP MLD may be an AP MLD 101 and the non-AP MLD may be a non-AP MLD 111. It is understood that further references to an AP MLD or non-AP MLD herein refer to an AP MLD 101 or non-AP MLD 111, respectively. Although the AP MLD 101 is illustrated with three affiliated APs—AP1, AP2, and AP3—and non-AP MLD 111 is illustrated with three affiliated STAs—STA1, STA2, and STA3—it is understood that this is just an example, and any appropriate MLDs with any number of affiliated APs or STAs may be used. In this example, there are three links formed between the AP MLD and the non-AP MLD—Link 1 between AP1 and STA1, Link 2 between AP2 and STA2, and Link 3 between AP3 and STA3.

In the example of FIG. 3, in order to establish a broadcast TWT schedule on a given link between the AP MLD and the associated non-AP MLD, the corresponding TWT negotiation needs to take place on that same link. For example, to establish a first broadcast TWT schedule (e.g., a schedule that includes the TWT service period (SP) TWT SP1) on a first link (e.g., Link 1) between the AP MLD and the non-AP MLD, the exchange of the TWT Setup frames (e.g., TWT Request frame 302 and TWT Response frame 304) corresponding to the broadcast TWT negotiation for the first broadcast TWT schedule needs to happen on the first link (Link 1).

Various embodiments of the present disclosure facilitate performing broadcast TWT negotiation on a second link between the AP MLD and the non-AP MLD in order to establish the broadcast TWT schedule on the first link between the same AP MLD and the non-AP MLD. In comparison to performing this TWT negotiation on the first link, this can reduce latency in establishing the TWT schedule on the first link since the STA that is affiliated with the non-AP MLD and operating on the second link may gain access to the channel faster than the STA that is affiliated with the non-AP MLD and operating on the first link.

According to some embodiments, a TWT scheduling AP affiliated with an AP MLD and a TWT scheduled STA affiliated with a non-AP MLD, for negotiating membership of a broadcast TWT schedule, will follow general rules defined in the current 802.11 specification for TWT (e.g., the rules in sections 26.8.3.1 (General), 26.8.3.2 (Rules for TWT scheduling AP), and 26.8.3.3 (Rules for TWT scheduled STA) of IEEE P802.11be D2.1) with the following additional rules: The TWT scheduled STA affiliated with the non-AP MLD or the TWT scheduling AP affiliated with the AP MLD, while negotiating for broadcast TWT schedules, may indicate the links between the AP MLD and the non-AP MLD for which the negotiation is being conducted (e.g., in a Broadcast TWT element transmitted in the TWT Setup frames). The TWT scheduled STA or the TWT scheduling AP transmitting the Broadcast TWT element may make the link indication in a Link ID Bitmap subfield in a Broadcast TWT Parameter Set field corresponding to the broadcast TWT schedule (discussed further herein below).

Figure 4:
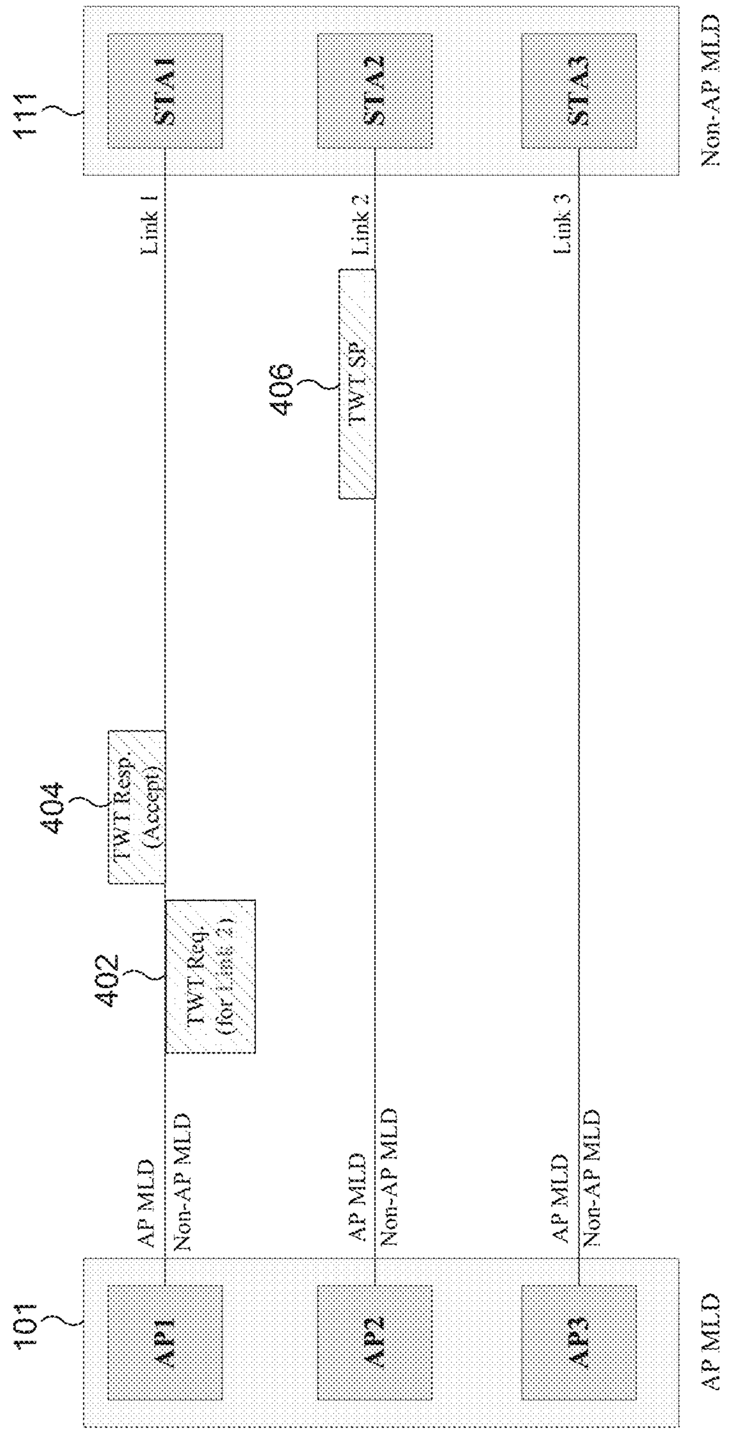
FIG. 4 illustrates an example of broadcast TWT negotiation on one link for establishment of a broadcast TWT schedule on another link according to embodiments of the present disclosure.

FIG. 4 illustrates an example of broadcast TWT negotiation on one link for establishment of a broadcast TWT schedule on another link according to embodiments of the present disclosure. In the example of FIG. 4, similar to that of FIG. 3, there are three links formed between the AP MLD and the non-AP MLD—Link 1 between AP1 and STA1, Link 2 between AP2 and STA2, and Link 3 between AP3 and STA3.

In this example, to establish a broadcast TWT schedule (e.g., a schedule that includes the TWT SP 406) on a first link (e.g., Link 2) between the AP MLD and the non-AP MLD, the exchange of the TWT Setup frames (e.g., TWT Request frame 402 and TWT Response frame 404) corresponding to the broadcast TWT negotiation for the broadcast TWT schedule happens on a second link (e.g., Link 1) between the same AP MLD and non-AP MLD. Although the non-AP MLD is illustrated as transmitting the TWT Request frame 402 and the AP MLD is illustrated as transmitting the TWT Response frame 404, it is understood that these roles could be reversed.

In some embodiments, the TWT Request frame (e.g., TWT Request frame 402) includes a Broadcast TWT element that has a Broadcast TWT Parameter Set field corresponding to the broadcast TWT schedule that is under negotiation. A link indication may be included in the Broadcast TWT Parameter Set field to indicate the links for which the broadcast TWT schedule is being negotiated.

Figure 5:
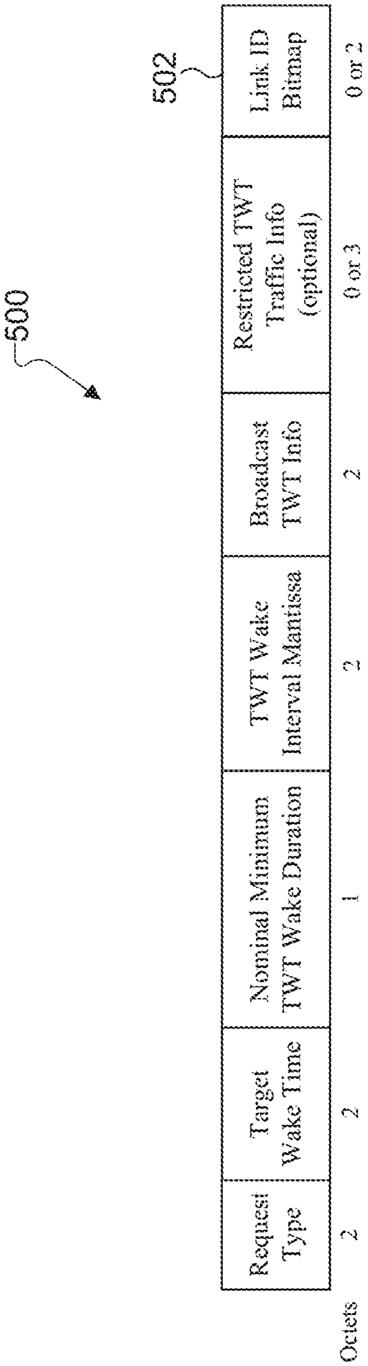
FIG. 5 illustrates an example format of a Broadcast TWT Parameter Set field in a Broadcast TWT element according to embodiments of the present disclosure.

FIG. 5 illustrates an example format of a Broadcast TWT Parameter Set field 500 in a Broadcast TWT element according to embodiments of the present disclosure. In the example of FIG. 5, the Broadcast TWT Parameter Set field 500 includes a Link ID Bitmap subfield 502.

According to one embodiment, the Link ID Bitmap subfield 502 in the Broadcast TWT Parameter Set field 500 indicates whether or not the Broadcast TWT Parameter Set field 500 applies to a particular link between the AP MLD and the non-AP MLD. If a bit i in the Link ID Bitmap subfield 502 is set to 1, it would indicate that the TWT negotiation corresponding to the Broadcast TWT Parameter Set field 500 applies to the i-th link between the AP MLD and the non-AP MLD. Otherwise, the Broadcast TWT Parameter Set field 500 does not apply to the i-th link between the AP MLD and the non-AP MLD.

According to one embodiment, the presence of the Link ID Bitmap subfield 502 in the Broadcast TWT Parameter Set field 500 can be indicated by a Link ID Bitmap Present subfield in the Control field of the Broadcast TWT element. If the Link ID Bitmap Present subfield in the Control field is set to 1, then the Link ID Bitmap subfield 502 is present in the Broadcast TWT Parameter Set field 500. Otherwise, the Link ID Bitmap subfield 502 is not present in the Broadcast TWT Parameter Set field 500.

According to one embodiment, if only one link is indicated in a Link ID Bitmap subfield in a Broadcast TWT Parameter Set field transmitted by a TWT scheduled STA affiliated with the non-AP MLD or a TWT scheduling AP affiliated with the AP MLD, the corresponding broadcast TWT schedule is negotiated on behalf of the STA affiliated with the same MLD and operating on the indicated link between the AP MLD and the non-AP MLD. Additionally, the Target Wake Time field in the Broadcast TWT Parameter Set field will be in reference to the timing synchronization function (TSF) time of the link indicated in the Link ID Bitmap subfield in the Broadcast TWT Parameter Set field.

According to one embodiment, a TWT scheduling AP affiliated with the AP MLD or a TWT scheduled STA affiliated with the non-AP MLD that receives a broadcast TWT parameter set containing a Link ID Bitmap subfield (e.g., the AP MLD that receives the TWT Request frame 402 in FIG. 4) may then indicate links in a Link ID Bitmap subfield of the corresponding Broadcast TWT Parameter Set field in the TWT element in the response frame it transmits (e.g., in the TWT Response frame 404 transmitted by the AP MLD in FIG. 4). In such a case, the Link ID Bitmap subfield in the response frame shall indicate the same links that were indicated in the corresponding Broadcast TWT Parameter Set field in the TWT element in the received request frame.

In some embodiments, a Broadcast TWT element may include multiple Broadcast TWT Parameter Set fields. Each Broadcast TWT Parameter Set field may correspond to a respective broadcast TWT schedule that is under negotiation. According to one embodiment, if the Link ID Bitmap Present subfield in the Control field in such a Broadcast TWT element is set to 1, then all of the Broadcast TWT Parameter Set fields included in the Broadcast TWT element shall contain a Link ID Bitmap subfield. If the Link ID Bitmap Present subfield is set to 0, then none of the Broadcast TWT Parameter Set fields included in the Broadcast TWT element shall contain a Link ID Bitmap subfield.

According to one embodiment, if a TWT scheduling AP affiliated with an AP MLD or a TWT scheduled STA affiliated with a non-AP MLD receives a Broadcast TWT element that has a Link ID Bitmap Present subfield set to 0, it indicates that any broadcast TWT parameter sets included in the received broadcast TWT element apply to the link on which the broadcast TWT element is received.

According to one embodiment, the AP MLD or the non-AP MLD shall not transmit a TWT element over a link set up between the AP MLD and the non-AP MLD that includes a TWT parameter set field containing a Link ID Bitmap subfield with a k-th bit in the bitmap set to 1 if the corresponding k-th link is disabled for the non-AP MLD through TID-to-Link mapping.

According to some embodiments, an R-TWT scheduling AP or an R-TWT scheduled STA, for negotiating membership of a restricted TWT schedule in the context of multi-link operation, will follow general rules defined in the current 802.11 specification for broadcast TWT (e.g., the rules in section 35.8.3 (Broadcast TWT operation) of IEEE P802.11be D2.1) with additional rules described herein below.

According to one embodiment, for R-TWT operation between an AP MLD and a non-AP MLD, the AP MLD or the non-AP MLD will not transmit a TWT element over any of the set up links between the AP MLD and the non-AP MLD that includes an R-TWT parameter set with the k-th bit in a Restricted TWT DL TID Bitmap subfield or Restricted TWT UL TID Bitmap subfield (if present) set to 1 when the TID k for the respective direction (i.e., for the downlink (DL) or uplink (UL) direction) is not mapped on the intended link for which the restricted TWT schedule is being negotiated. Additionally, the AP MLD or the non-AP MLD will not transmit a TWT element over any of the links between them that includes an R-TWT parameter set with a DL TID Bitmap Valid subfield or UL TID Bitmap Valid subfield (if present) set to 0 if any TIDs are not mapped on the intended link for the respective direction.

According to one embodiment, an R-TWT scheduling AP that receives a request from a non-AP STA (e.g., a non-AP STA affiliated with a non-AP MLD) to establish membership in an R-TWT schedule with an R-TWT Schedule Full subfield set to 1 can reject the request. According to another embodiment, the R-TWT scheduling AP can respond with any of the following responses: Accept TWT, Reject TWT, Alternate TWT, or Dictate TWT. According to another embodiment, the R-TWT scheduling AP can adjust the TWT parameters of the R-TWT schedule to accommodate the request of the non-AP STA.

According to one embodiment, if a TWT scheduled STA affiliated with a non-AP MLD sends a TWT element to its associated AP affiliated with the AP MLD that includes a Link ID Bitmap subfield in a Broadcast TWT Parameter Set field, where the link indicated in the Link ID Bitmap subfield of the Broadcast TWT Parameter Set field is a different link than the link on which the TWT element is sent, then the TWT Setup Command subfield in the Request Type field of the Broadcast TWT Parameter Set field can be set to 0 (Request TWT).

According to one embodiment, if a TWT scheduled STA affiliated with a non-AP MLD sends a TWT element to its associated AP affiliated with the AP MLD that includes a Link ID Bitmap subfield in a Broadcast TWT Parameter Set field, where the link indicated in the Link ID Bitmap subfield of the Broadcast TWT Parameter Set field is a different link than the link on which the TWT element is sent, then the TWT Setup Command subfield in the Request Type field of the Broadcast TWT Parameter Set field cannot be set to 1 or 2 (Suggest TWT or Demand TWT).

According to some embodiments, a first STA affiliated with a non-AP MLD and operating on a first link that negotiates to establish a TWT schedule for a second STA affiliated with the same non-AP MLD and operating on a second link can request to establish a broadcast TWT schedule for the second STA where the broadcast TWT schedule already exists in the BSS. That is, the first STA can negotiate for the second STA to join (i.e., become a member of) an existing broadcast TWT schedule. According to one such embodiment, the first STA in this case can only request to establish a TWT schedule for the second STA where the TWT schedule already exists in the BSS (i.e., the first STA cannot request for the TWT scheduling AP to create a new broadcast TWT schedule for the second STA). That is, a TWT request through cross link TWT negotiation in an MLD may only be applicable to those TWT schedules that already exist in the BSS.

Figure 6:
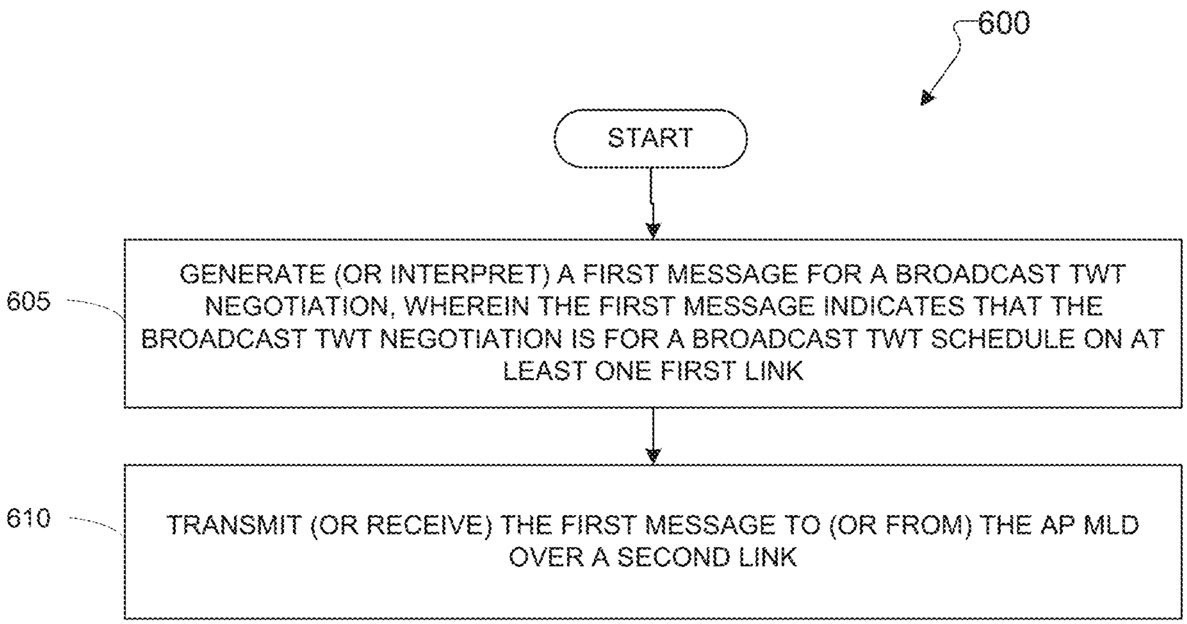
FIG. 6 illustrates an example process for facilitating broadcast TWT negotiation on one link between MLDs to establish broadcast TWT schedules on other links between the same MLDs according to various embodiments of the present disclosure.

FIG. 6 illustrates an example process 600 for facilitating broadcast TWT negotiation on one link between MLDs to establish broadcast TWT schedules on other links between the same MLDs according to various embodiments of the present disclosure. The process 600 of FIG. 6 is discussed as being performed by a non-AP MLD, but it is understood that a corresponding AP MLD performs a corresponding process. Additionally, for convenience the process of FIG. 6 is discussed as being performed by a WI-FI non-AP MLD comprising a plurality of STAs that each comprise a transceiver configured to configured to form a link with a corresponding AP affiliated with a WI-FI AP MLD. However, it is understood that any suitable wireless communication device could perform this process.

Referring to FIG. 6, the process 600 begins with the non-AP MLD generating (or interpreting) a first message for a broadcast TWT negotiation, wherein the first message indicates that the broadcast TWT negotiation is for a broadcast TWT schedule on at least one first link of the links between the non-AP MLD and the AP MLD (step 605). In the case in which the non-AP MLD is the initiator of the broadcast TWT negotiation, the non-AP MLD generates the first message. When the AP MLD is the initiator of the broadcast TWT negotiation, the non-AP MLD interprets the first message.

The non-AP MLD then transmits the first message to the AP MLD over a second of the links (step 610). In this case the non-AP MLD is the initiator of the broadcast TWT negotiation. When the AP MLD is the initiator of the broadcast TWT negotiation, then step 610 instead occurs before step 605 and the non-AP MLD receives the first message from the AP MLD over the link at step 610.

In some embodiments of process 600, the first message includes a Link ID bitmap that is associated with a broadcast TWT parameter set that corresponds to the broadcast TWT schedule under negotiation, and an entry in the Link ID bitmap corresponding to each of the first links is set to indicate that the broadcast TWT negotiation is for the broadcast TWT schedule on the first links. In such embodiments, the non-AP MLD receives (or generates) a second message for the broadcast TWT negotiation as a response to the first message, and the second message includes a second Link ID bitmap in a second broadcast TWT parameter set that corresponds to the broadcast TWT schedule under negotiation. An entry in the second Link ID bitmap corresponding to each of the first links is set, and the transceiver of the first STA is further configured to receive or transmit the second message from or to the AP MLD over the second link.

In some embodiments of process 600, the first message includes broadcast TWT parameter sets that each correspond to a different broadcast TWT schedule under negotiation, and the first message includes an indication that either: a respective Link ID bitmap associated with each of the broadcast TWT parameter sets is included in the first message, or no Link ID bitmaps associated with any of the broadcast TWT parameter sets are included in the first message. In some such embodiments, the indication that no Link ID bitmaps are included in the first message is an indication that all of the different broadcast TWT schedules are under negotiation for the second link.

In some embodiments of process 600, the first links are links that have not been disabled for the non-AP MLD through TID-to-link mapping.

In some embodiments of process 600, the broadcast TWT negotiation is for a restricted TWT schedule, and the first message includes an indication of uplink (UL) TIDs and downlink (DL) TIDs, for which UL traffic and DL traffic transmissions, respectively, will be permitted according to the restricted TWT schedule. In these embodiments the indicated UL TIDs and DL TIDs are mapped to the first links through TID-to-link mapping.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:

stations (STAs) each comprising a transceiver configured to form a link with a corresponding AP of an AP MLD; and a processor operably coupled to the STAs, the processor configured to generate or receive a first message for a broadcast target wake time (TWT) negotiation, wherein the first message indicates that the broadcast TWT negotiation is for a broadcast TWT schedule on at least one first link of the links as indicated by a Link ID Bitmap subfield of the first message, wherein the transceiver of a first of the STAs is further configured to transmit or receive the first message to or from the AP MLD over a second link of the links, and wherein, when the at least one first link indicated in the Link ID Bitmap subfield is different from the second link, a TWT Setup Command subfield in a Request Type field of a broadcast TWT parameter set is set to Request TWT and is not set to Suggest TWT or Demand TWT.

2. The non-AP MLD of claim 1, wherein:

the first message includes a Link ID bitmap that is associated with the broadcast TWT parameter set that corresponds to the broadcast TWT schedule under negotiation, an entry in the Link ID bitmap corresponding to each of the first links is set to indicate that the broadcast TWT negotiation is for the broadcast TWT schedule on the first links, and when only one link is indicated in the Link ID Bitmap subfield, a TWT field in the broadcast TWT parameter set is in reference to a timing synchronization function (TSF) time of the link indicated in the Link ID Bitmap subfield.

3. The non-AP MLD of claim 2, wherein:

the processor is further configured to receive or generate a second message for the broadcast TWT negotiation as a response to the first message, the second message includes a second Link ID bitmap in a second broadcast TWT parameter set that corresponds to the broadcast TWT schedule under negotiation, an entry in the second Link ID bitmap corresponding to each of the first links is set, and the transceiver of the first STA is further configured to receive or transmit the second message from or to the AP MLD over the second link.

4. The non-AP MLD of claim 1, wherein:

the first message includes broadcast TWT parameter sets that each correspond to a different broadcast TWT schedule under negotiation, and the first message includes an indication that either:

a respective Link ID bitmap associated with each of the broadcast TWT parameter sets is included in the first message; or no Link ID bitmaps associated with any of the broadcast TWT parameter sets are included in the first message.

5. The non-AP MLD of claim 4, wherein the indication that no Link ID bitmaps are included in the first message is an indication that all of the different broadcast TWT schedules are under negotiation for the second link.

6. The non-AP MLD of claim 1, wherein the first links have not been disabled for the non-AP MLD through traffic identifier (TID)-to-link mapping.

7. The non-AP MLD of claim 1, wherein:

the broadcast TWT negotiation is for a restricted TWT schedule, the first message includes an indication of uplink (UL) TIDs and downlink (DL) TIDS, for which UL traffic and DL traffic transmissions, respectively, will be permitted according to the restricted TWT schedule, and the indicated UL traffic identifiers (TIDs) and DL TIDs are mapped to the first links through TID-to-link mapping.

8. A method of wireless communication performed by a non-access point (AP) multi-link device (MLD), the method comprising:

generating or interpreting a first message for a broadcast target wake time (TWT) negotiation, wherein the first message indicates that the broadcast TWT negotiation is for a broadcast TWT schedule on at least one first link of the links as indicated by a Link ID Bitmap subfield of the first message and wherein the non-AP MLD comprises stations (STAs) that each comprise a transceiver configured to form a link with a corresponding AP of an AP MLD; and transmitting or receiving the first message to or from the AP MLD over a second link of the links, wherein, when a link indicated in the Link ID Bitmap subfield is different from the second link, a TWT Setup Command subfield in a Request Type field of a broadcast TWT parameter set is set to Request TWT and is not set to Suggest TWT or Demand TWT.

9. The method of claim 8, wherein:

the first message includes a Link ID bitmap that is associated with the broadcast TWT parameter set that corresponds to the broadcast TWT schedule under negotiation, an entry in the Link ID bitmap corresponding to each of the first links is set to indicate that the broadcast TWT negotiation is for the broadcast TWT schedule on the first links, and when only one link is indicated in the Link ID Bitmap subfield, a TWT field in the broadcast TWT parameter set is in reference to a timing synchronization function (TSF) time of the link indicated in the Link ID Bitmap subfield.

10. The method of claim 9, further comprising:

receiving or generating a second message for the broadcast TWT negotiation as a response to the first message, wherein:

the second message includes a second Link ID bitmap in a second broadcast TWT parameter set that corresponds to the broadcast TWT schedule under negotiation, and an entry in the second Link ID bitmap corresponding to each of the first links is set; and receiving or transmitting the second message from or to the AP MLD over the second link.

11. The method of claim 8, wherein:

the first message includes broadcast TWT parameter sets that each correspond to a different broadcast TWT schedule under negotiation, and the first message includes an indication that either:

a respective Link ID bitmap associated with each of the broadcast TWT parameter sets is included in the first message; or no Link ID bitmaps associated with any of the broadcast TWT parameter sets are included in the first message.

12. The method of claim 11, wherein the indication that no Link ID bitmaps are included in the first message is an indication that all of the different broadcast TWT schedules are under negotiation for the second link.

13. The method of claim 8, wherein the first links have not been disabled for the non-AP MLD through traffic identifier (TID)-to-link mapping.

14. The method of claim 8, wherein:

the broadcast TWT negotiation is for a restricted TWT schedule, the first message includes an indication of uplink (UL) TIDs and downlink (DL) TIDS, for which UL traffic and DL traffic transmissions, respectively, will be permitted according to the restricted TWT schedule, and the indicated UL traffic identifiers (TIDs) and DL TIDs are mapped to the first links through TID-to-link mapping.

15. An access point (AP) multi-link device (MLD), comprising:

APs each comprising a transceiver configured to form a link with a corresponding station (STA) of a non-AP MLD; and a processor operably coupled to the APs, the processor configured to generate or receive a first message for a broadcast target wake time (TWT) negotiation, wherein the first message indicates that the broadcast TWT negotiation is for a broadcast TWT schedule on at least one first link of the links as indicated by a Link ID Bitmap subfield of the first message, wherein the transceiver of a first of the APs is further configured to transmit or receive the first message to or from the non-AP MLD over a second link of the links, and wherein, when a link indicated in the Link ID Bitmap subfield is different from the second link, a TWT Setup Command subfield in a Request Type field of a broadcast TWT parameter set is set to Request TWT and is not set to Suggest TWT or Demand TWT.

16. The AP MLD of claim 15, wherein:

the first message includes a Link ID bitmap that is associated with the broadcast TWT parameter set that corresponds to the broadcast TWT schedule under negotiation, an entry in the Link ID bitmap corresponding to each of the first links is set to indicate that the broadcast TWT negotiation is for the broadcast TWT schedule on the first links, and when only one link is indicated in the Link ID Bitmap subfield, a TWT field in the broadcast TWT parameter set is in reference to a timing synchronization function (TSF) time of the link indicated in the Link ID Bitmap subfield.

17. The AP MLD of claim 16, wherein:

the processor is further configured to receive or generate a second message for the broadcast TWT negotiation as a response to the first message, the second message includes a second Link ID bitmap in a second broadcast TWT parameter set that corresponds to the broadcast TWT schedule under negotiation, an entry in the second Link ID bitmap corresponding to each of the first links is set, and the transceiver of the first AP is further configured to receive or transmit the second message from or to the non-AP MLD over the second link.

18. The AP MLD of claim 15, wherein:

the first message includes broadcast TWT parameter sets that each correspond to a different broadcast TWT schedule under negotiation, and the first message includes an indication that either:

a respective Link ID bitmap associated with each of the broadcast TWT parameter sets is included in the first message; or no Link ID bitmaps associated with any of the broadcast TWT parameter sets are included in the first message.

19. The AP MLD of claim 15, wherein the first links have not been disabled for the non-AP MLD through traffic identifier (TID)-to-link mapping.

20. The AP MLD of claim 15, wherein:

the broadcast TWT negotiation is for a restricted TWT schedule, the first message includes an indication of uplink (UL) TIDs and downlink (DL) TIDS, for which UL traffic and DL traffic transmissions, respectively, will be permitted according to the restricted TWT schedule, and the indicated UL traffic identifiers (TIDs) and DL TIDs are mapped to the first links through TID-to-link mapping.

* * * * *